United States Patent
Yasugi

(10) Patent No.: US 8,295,988 B2
(45) Date of Patent: Oct. 23, 2012

(54) GENERATING APPARATUS AND CONTROL METHOD THEREOF

(75) Inventor: Akira Yasugi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/601,153

(22) PCT Filed: May 1, 2009

(86) PCT No.: PCT/JP2009/058546
§ 371 (c)(1),
(2), (4) Date: Nov. 20, 2009

(87) PCT Pub. No.: WO2010/125687
PCT Pub. Date: Nov. 4, 2010

(65) Prior Publication Data
US 2012/0035774 A1    Feb. 9, 2012

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 1/12 | (2006.01) |
| H02J 3/02 | (2006.01) |
| H02J 3/38 | (2006.01) |
| G05F 5/00 | (2006.01) |

(52) U.S. Cl. .............. 700/287; 307/21; 307/25; 307/82; 323/207
(58) Field of Classification Search .................. 700/287; 290/44; 307/21, 22, 25, 82; 323/207, 222; 363/13, 37
See application file for complete search history.

(56) References Cited

U.S. PATENT DOCUMENTS
7,417,336 B2 * 8/2008 Johnson .......................... 307/22
(Continued)

FOREIGN PATENT DOCUMENTS
EP    2256893 A1 * 12/2010
(Continued)

OTHER PUBLICATIONS
International Search Report for PCT/JP2009/058546, dated Aug. 11, 2009.
(Continued)

Primary Examiner — Crystal J Barnes-Bullock
(74) Attorney, Agent, or Firm — Lowe, Hauptman, Ham & Berner

(57) ABSTRACT

Voltage of a utility grid is reliably and swiftly restored, which decreased due to a utility grid failure or the like, to reference voltage. A generator is connected to a utility grid. A voltage detecting section detects voltage of a utility grid. A control section determines reactive current corresponding to the voltage obtained from the voltage detecting section based on voltage current correlation information in which the voltage of the utility grid and the reactive current to be supplied to the utility grid are correlated with each other. An electric power converting section regulates the reactive current to be supplied to or absorbed from the utility grid. An information changing section changes the voltage current correlation information to increase an amount of the reactive current with respect to a variation in the voltage in the voltage current correlation information, in the case where the voltage of the utility grid is not in a predetermined range set in advance after a predetermined time period has passed since the voltage of the utility grid varied by a predetermined amount.

3 Claims, 4 Drawing Sheets

U.S. PATENT DOCUMENTS

| | | | |
|---|---|---|---|
| 7,560,909 B2 * | 7/2009 | Coleman | 323/222 |
| 7,569,944 B2 * | 8/2009 | Oohara et al. | 290/44 |
| 7,605,487 B2 * | 10/2009 | Barton et al. | 290/44 |
| 7,952,214 B2 | 5/2011 | Ichinose et al. | |
| 8,008,793 B2 * | 8/2011 | Andresen | 290/44 |
| 8,120,932 B2 * | 2/2012 | Folts et al. | 363/37 |
| 2007/0273155 A1 | 11/2007 | Barton et al. | |
| 2009/0302686 A1 * | 12/2009 | Fishman | 307/82 |

FOREIGN PATENT DOCUMENTS

| | | | |
|---|---|---|---|
| JP | 5027856 A | 2/1993 | |
| JP | 6284798 A | 10/1994 | |
| JP | 2000132252 A | 5/2000 | |
| JP | 2000-175360 | 6/2000 | |
| JP | 2004153941 A | 5/2004 | |
| JP | 2008301584 A | 12/2008 | |
| TW | 390544 A | 5/2000 | |
| TW | 200637100 A | 10/2006 | |
| TW | 1290788 | 12/2007 | |
| TW | 200826433 A | 6/2008 | |

OTHER PUBLICATIONS

Korean Office Action for KR10-2010-7020825, mailed Oct. 13, 2011.

Korean Office Action for KR10-2010-7020825, mailed Mar. 5, 2012.

Approval Decision Letter—Taiwanese Application No. 098115184 received by TW Associate on Jul. 5, 2012, which corresponds to U.S. Appl. No. 12/601,153.

* cited by examiner

GENERATING APPARATUS AND CONTROL METHOD THEREOF

CROSS-REFERENCE TO RELATED APPLICATIONS

The present Application is based on International Application No. PCT/JP2009/058546, filed on May 1, 2009, and priority is hereby claimed under 35 USC §119 based on this application. Each application is hereby incorporated by reference in its entirety into the present application.

TECHNICAL FIELD

The present invention relates to a generating apparatus and a control method thereof.

BACKGROUND ART

Conventionally, in the case where a utility grid failure occurs in a wind power generating system for interconnecting a wind turbine generator, voltage of a utility grid varies. In order to restore the varied voltage to reference voltage, reactive current is supplied from a generator to the utility grid or reactive current is absorbed from the utility grid into the generator.

Patent Document 1: US Patent Application, Publication No. 2007/0273155

DISCLOSURE OF INVENTION

A relationship between a variation in the voltage of the utility grid and an amount of reactive current to be supplied (absorbed) in response to the variation is uniquely given by a table or the like, and this table is determined based on simulations performed at the time of installation of the wind turbine generator.

However, even in the case where the reactive current is supplied based on the table obtained by the simulations and the voltage of the utility grid gradually recovers according to the table, the voltage of the utility grid may become saturated and stabilized before the voltage recovers to the reference voltage in some cases.

In this case, even though the electric power supplier needs to supply more reactive current to restore the voltage of the utility grid to the reference voltage, it is impossible to supply (absorb) any more reactive current to the utility grid once the voltage has become stable. In other words, even in the case where control is carried out in order to restore the voltage of the utility grid based on the table determined by simulations or the like, the result in the actual environment is not the same as that in the simulations and it is impossible to reliably restore the voltage of the utility grid upon the utility grid failure or the like.

The present invention has been made to solve the above problem, and it is an object thereof to provide a generating apparatus and a control method of the apparatus for reliably and swiftly restore voltage of a utility grid decreased due to a utility grid failure or the like to reference voltage.

In order to achieve the above object, the present invention employs the following solutions.

A first aspect of the present invention recites a generating apparatus including: a generator connected to a utility grid; a voltage detecting section for detecting voltage of the utility grid; and a control section for determining reactive current corresponding to the voltage obtained from the voltage detecting section based on voltage current correlation information in which the voltage of the utility grid and the reactive current to be supplied to the utility grid are correlated with each other and controlling the electric power converting section to regulate the reactive current to be supplied to or absorbed from the utility grid, the apparatus further including an information changing section for changing the voltage current correlation information to increase an amount of reactive current with respect to a variation in the voltage in the voltage current correlation information, in the case where the voltage of the utility grid is not in a predetermined range set in advance after a predetermined time period has passed since the voltage of the utility grid varied by a predetermined amount or more.

With this structure, when the voltage of the utility grid is detected by the voltage detecting section and the control section obtains the detected voltage, the control section determines the reactive current corresponding to the obtained voltage based on the voltage current correlation information in which the voltage of the utility grid and the reactive current to be supplied to the utility grid are correlated with each other and controls the electric power converting section to supply or absorb the determined reactive current to or from the utility grid. The information changing section changes the voltage current correlation information to increase the amount of the reactive current with respect to the variation in the voltage in the voltage current correlation information, in the case where the voltage of the utility grid is not in the predetermined range set in advance after the predetermined time period has passed since the voltage of the utility grid varied by the predetermined amount or more.

Because the electric power converting section is controlled based on the voltage current correlation information changed to increase the amount of the reactive current with respect to the variation in the voltage in the case where the voltage of the utility grid varied by the predetermined amount or more as described above, it is possible to further speed up supply or absorption of the reactive current to bring the voltage of the utility grid close to the predetermined range set in advance, when it is impossible to supply or absorb sufficiently the reactive current by controlling the reactive current based on the voltage current correlation information before the change. In this way, it is possible to swiftly stabilize the utility grid voltage.

In the above generating apparatus, the information changing section may be capable of changing the amount of the reactive current with respect to the variation in the voltage in the voltage current correlation information based on a difference between the reference voltage and the voltage value of the utility grid after the predetermined time period has passed since the voltage of the utility grid varied by the predetermined amount or more.

By changing the amount of the reactive current with respect to the variation in the voltage based on the difference between the voltage value of the utility grid and the reference voltage as described above, it is possible to supply or absorb the appropriate and necessary amount of the reactive current.

A second aspect of the present invention recites a control method of a generating apparatus including: a generator connected to a utility grid; a voltage detecting section for detecting voltage of the utility grid; and a control section for determining reactive current corresponding to the voltage obtained from the voltage detecting section based on voltage current correlation information in which the voltage of the utility grid and the reactive current to be supplied to the utility grid are correlated with each other and controlling an electric power converting section to regulate the reactive current to be supplied to or absorbed from the utility grid, the method including the step of changing the voltage current correlation information to increase an amount of the reactive current with respect to a variation in the voltage in the voltage current correlation information, in the case where the voltage of the utility grid is not in a predetermined range set in advance after a predetermined time period has passed since the voltage of the utility grid varied by a predetermined amount or more.

According to the present invention, it is possible to reliably and swiftly restore the voltage of the utility grid, which decreased due to a utility grid failure or the like, to the reference voltage.

EXPLANATION OF REFERENCE

Figure 1:
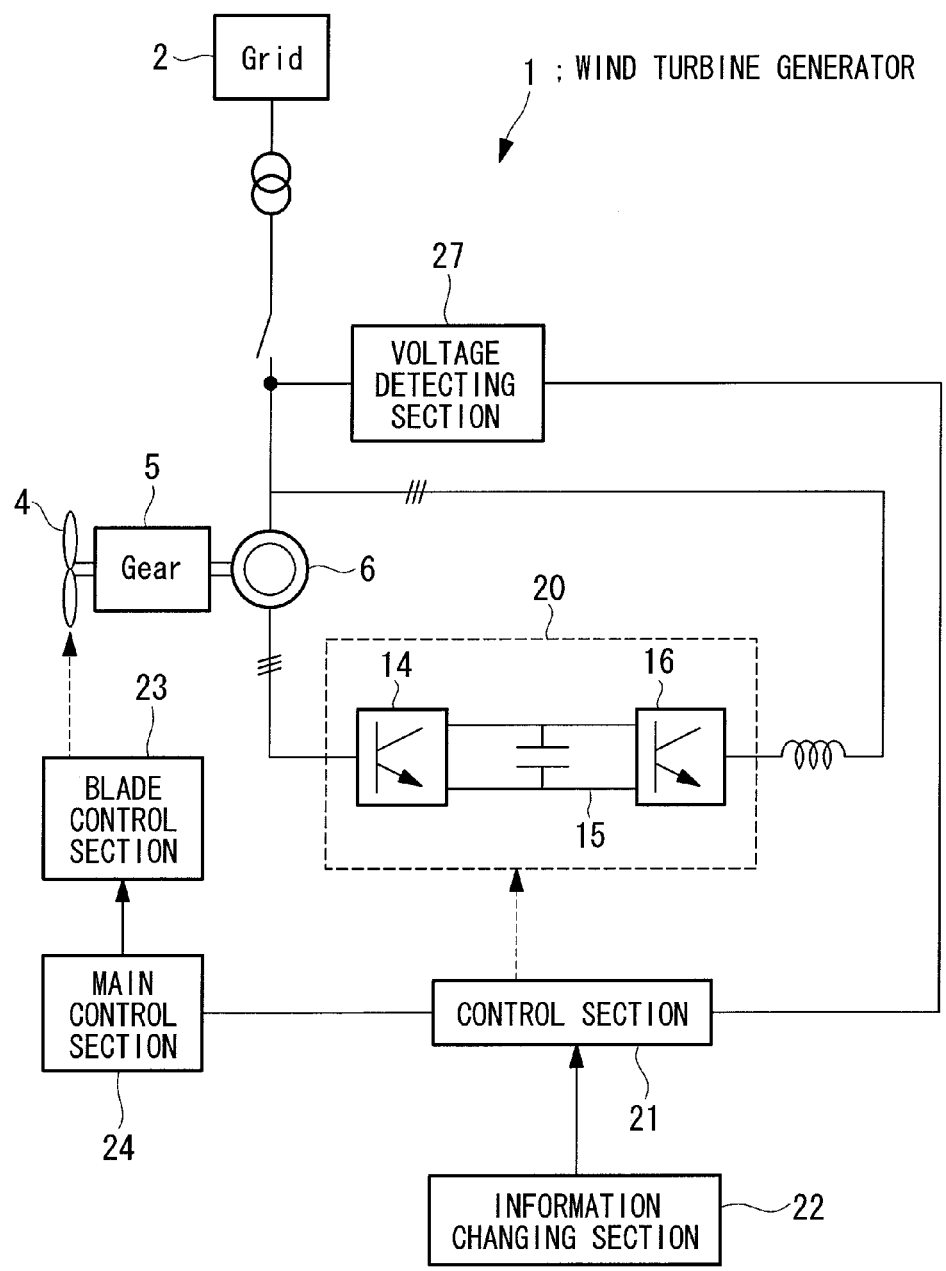
FIG. 1 is a block diagram showing an example of a wind turbine generator according to an embodiment of the present invention.

1: Wind turbine generator
2: Utility grid
14: Converter
15: DC bus
16: Inverter
20: Electric power converting section
21: Control section
22: Information changing section
27: Voltage detecting section

BEST MODE FOR CARRYING OUT THE INVENTION

An embodiment of a generating apparatus and a control method thereof according to the present invention will be described below with reference to the drawings.

FIG. 1 is a block diagram showing an example of a generator 6 provided to a wind turbine generator and components around the generator 6.

As shown in FIG. 1, a wind turbine generator 1 includes wind turbine blades 4, a gear 5, the generator 6, an electric power converting section 20, a control section 21, an information changing section 22, a voltage detecting section 27, a blade control section 23, and a main control section 24. The generator 6 is connected to a utility grid 2. A rotor of the generator 6 is joined to a wind turbine rotor (not shown) with the gear 5 interposed therebetween.

In the present embodiment, the generator (induction machine) 6 is formed so that electric power generated by the generator 6 can be outputted to the utility grid 2 from both of a stator coil and a rotor coil. Specifically, the generator 6 has the stator coil connected to the utility grid 2 and the rotor coil connected to the utility grid 2 with the electric power converting section 20 interposed therebetween.

The voltage detecting section 27 is provided on an electric power line that connects the generator 6 to the utility grid 2, and detects voltage of the utility grid 2. The voltage measured by the voltage detecting section 27 is provided to the control section 21.

The electric power converting section 20 includes a converter 14, a DC bus 15, and an inverter 16, and converts AC power received from the rotor coil into AC power adapted to a frequency of the utility grid 2. The converter 14 converts the AC power generated in the rotor coil into DC current and outputs the DC current to the DC bus 15. The inverter 16 converts the DC power received from the DC bus 15 into the AC power at the frequency same as that of the utility grid 2 and outputs the AC power.

The electric power converting section 20 also has a function of converting AC power received from the utility grid 2 into AC power adapted to a frequency of the rotor coil. In this case, the inverter 16 converts the AC power into DC power and outputs the DC power to the DC bus 15. The converter 14 converts the DC power received from the DC bus 15 into the AC power adapted to the frequency of the rotor coil and supplies the AC power to the rotor coil of the generator 6.

The control section 21 has voltage current correlation information in which the voltage of the utility grid 2 and the reactive current to be supplied to or absorbed from the utility grid 2 are correlated with each other, and determines an amount of the reactive current corresponding to the voltage obtained from the voltage detecting section 27, and controls the electric power converting section 20 to supply or absorb the determined reactive current to or from the utility grid 2 based on the voltage current correlation information. More specifically, the control section 21 determines the reactive current that corresponds to an output voltage V measured by the voltage detecting section 27 and is to be supplied to or absorbed from the utility grid 2. Furthermore, the control section 21 controls a PWM (Pulse Width Modulation) signal for the converter 14 or the inverter 16, and controls regulation of the reactive current.

Figure 2:
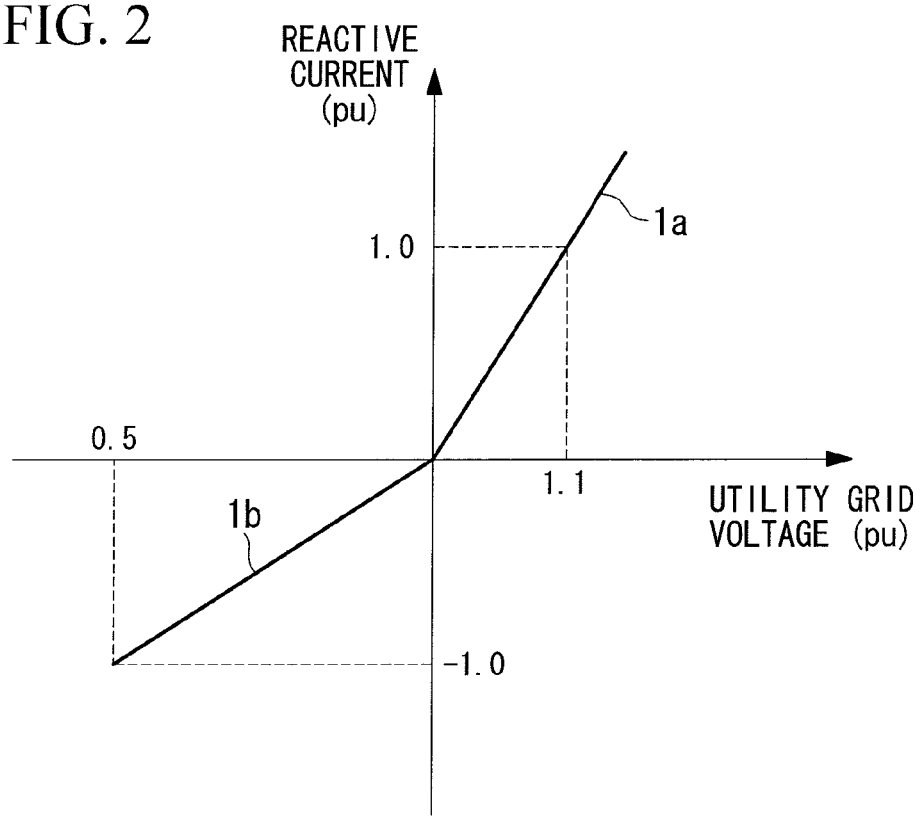
FIG. 2 is a graph showing an example of voltage current correlation information, before change, on a relationship between voltage of a utility grid and reactive current.

FIG. 2 shows an example of information which the control section 21 includes and in which the voltage of the utility grid and the reactive current are correlated with each other. In FIG. 2, a horizontal axis represents the voltage of the utility grid as a ratio to reference voltage (Pu: per unit), and the voltage is equal to 1.0 Pu that is the reference voltage at an intersection point of the horizontal axis with a vertical axis. The left side of 1.0 Pu on the horizontal axis in the drawing represents the utility grid voltage lower than the reference voltage, and the right side of 1.0 Pu in the drawing represents the utility grid voltage higher than the reference voltage.

On the other hand, in FIG. 2, the vertical axis sets no regulation of the reactive current as a reference (in other words, the intersection point of the vertical axis with the horizontal axis is 0 Pu) and represents an amount of the reactive current (Pu) to be regulated with respect to the reference. For example, a lower side of 0 Pu on the vertical axis in the drawing represents an amount of the reactive current to be supplied from the generator to the utility grid, and an upper side of 0 Pu in the drawing represents an amount of the reactive current to be absorbed from the utility grid to the generator.

Based on the information shown in FIG. 2, the control section 21 causes the generator 6 to supply the reactive current to the utility grid 2 when the measured utility grid voltage is lower than the reference voltage, and reduces the reactive current to be supplied to the utility grid 2 as the utility grid voltage approaches the reference voltage. When the measured utility grid voltage is higher than the reference voltage, the control section 21 causes the generator 6 to absorb the reactive current from the utility grid 2, and reduces the reactive current to be absorbed from the utility grid 2 as the utility grid voltage approaches the reference voltage.

In the case where the voltage of the utility grid 2 is not in a predetermined range set in advance after a predetermined time period has passed since the voltage of the utility grid 2 varied by a predetermined amount or more, the information changing section 22 changes the voltage current correlation information such that the amount of the reactive current is increased with respect to the variation in the voltage in the voltage current correlation information. For example, time elapsed from detection of passage of the predetermined time period to the change of the voltage current correlation information is from several milliseconds to several hundred milliseconds. The predetermined range of the voltage of the utility grid 2 is ±10% with respect to the reference voltage, for example.

Alternatively, the information changing section 22 may change the amount of the reactive current with respect to the variation in the voltage in the voltage current correlation information based on a difference between the voltage value of the utility grid 2 and the reference voltage after a predetermined time period has passed since the voltage of the utility grid 2 varied by a predetermined amount or more.

For example, in the case where electric power demand is different at different time of the day, e.g., daytime, evening, or midnight, recovery performance for recovering to the reference voltage is low in the case of low electric power demand at midnight or the like, and therefore a slope of the graph is preferably set to be larger (steeper). In the case of high electric power demand in the daytime or evening, the recovery performance for recovering to the reference voltage is high, and therefore the slope of the graph is preferably set to be smaller (gentler) than that of the graph for midnight.

The blade control section 23 controls a pitch angle β of the wind turbine blades 4 in response to a pitch command β* from the main control section 24. More specifically, the blade control section 23 controls the pitch angle β of the wind turbine blades 4 so as to be equated to the pitch command β*.

Along with the control of the converter 14 and the inverter 16, the blade control section 23 controls the pitch angle of the wind turbine blades 4. In other words, the blade control section 23 controls the pitch angle of the wind turbine blades 4 so as to be equated to a pitch angle determined based on a required output of the electric power converting section 20.

Next, operation of the wind turbine generator 1 according to the present embodiment in the case where the utility grid voltage decreases will be described with reference to FIGS. 2 to 4.

Figure 4:
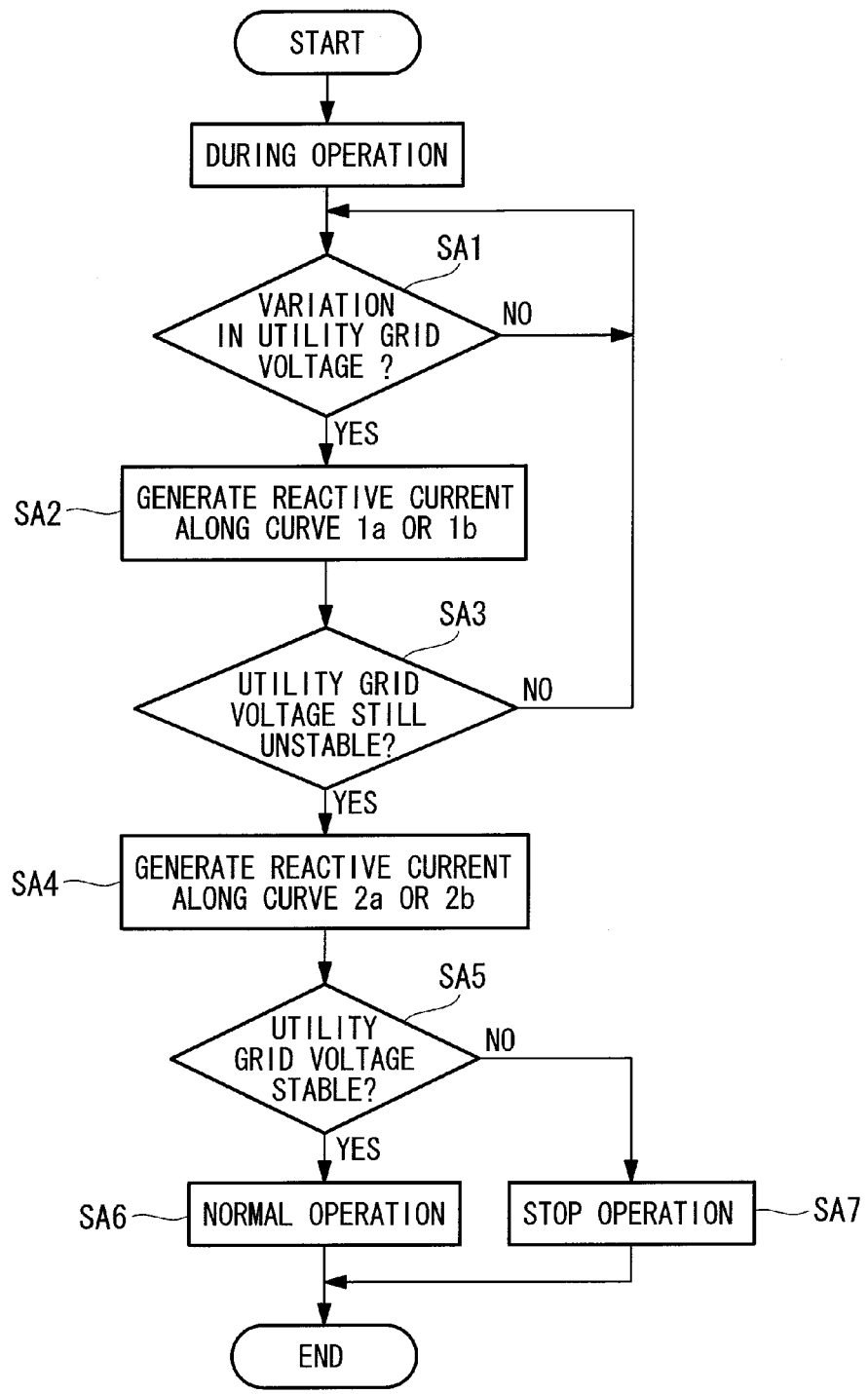
FIG. 4 is a chart showing an operation flow of a control method of the wind turbine generator according to the present invention.

First, the voltage of the utility grid 2 is detected by the voltage detecting section 27 and is outputted to the control section 21 (step SA1 in FIG. 4). The control section 21 determines whether or not the voltage value detected by the voltage detecting section 27 is different from the specified reference voltage by a predetermined amount or more. As a result, in the case where a failure or the like occurred in the utility grid and the utility grid voltage decreased abruptly to cause a voltage variation equal to or greater than the predetermined amount from the reference voltage, the control section 21 controls the reactive current based on the voltage current correlation information shown in FIG. 2 in which the voltage of the utility grid and the reactive current are correlated with each other. More specifically, the control section 21 determines the reactive current corresponding to the voltage detected by the voltage detecting section 27 based on the voltage current correlation information and controls the electric power converting section 20 to output the determined reactive current to the utility grid 2 so as to actuate the converter 14 or the inverter 16 (step SA2 in FIG. 4).

Based on the voltage of the utility grid 2 detected by the voltage detecting section 27, the control section 21 calculates a ratio of the present voltage value with respect to 1.0 Pu as the reference. For example, in the case where the voltage value detected by the voltage detecting section 27 is half the reference voltage, the control section 21 reads a value of the reactive current corresponding to 0.5 Pu in the voltage current correlation information shown in FIG. 2. As a result, the value −1.0 Pu, for example, is read as the reactive current.

Upon reading the value −1.0 Pu, the control section 21 controls the electric power converting section 20 to supply the reactive current of 1.0 to the utility grid 2. As a result, the inverter 16 in the electric power converting section 20 generates current having a 90° phase lead with respect to the voltage, and this reactive current is supplied to the utility grid 2. By supplying the reactive current to the utility grid 2 in this manner, the voltage of the utility grid 2 is increased gradually.

Thereafter, after the predetermined time period has passed since the predetermined amount of or greater variation was detected in the voltage of the utility grid with respect to the reference voltage, the control section 21 determines whether or not the voltage value newly detected by the voltage detecting section 27 is in the predetermined range from the reference voltage. In the case where the detected voltage value is not in the predetermined range as a result of the determination (step SA3 in FIG. 4), the information changing section 22 changes the voltage current correlation information presently used by the control section 21 (step SA4 in FIG. 4). More specifically, the information changing section 22 changes the voltage current correlation information so that the amount of the reactive current corresponding to the variation in the voltage of the utility grid 2 becomes larger than that in the voltage current correlation information (a broken line) 1a, 1b before the change as shown in FIG. 3. In FIG. 3, the voltage current correlation information after the change is shown in a solid line 2a, 2b.

When the voltage current correlation information is changed, the control section 21 obtains the reactive current (e.g., −1.0 pu) corresponding to the present voltage (e.g., 0.8 pu) of the utility grid 2 based on the changed voltage current correlation information, and controls the electric power converting section 20 based on the reactive current. As a result, the current having a 90° phase lead with respect to the voltage is generated and supplied to the utility grid 2. When the reactive current is supplied to the utility grid 2 and the utility grid voltage approaches the reference voltage to fall within (converge into) the predetermined voltage range (e.g., the voltage range of ±10 percent (0.9 to 1.1 Pu) from the reference voltage 1.0 Pu), the utility grid voltage is considered to be stabilized. When the electric power converting section 20 is controlled based on the changed voltage current correlation information after the change and the utility grid voltage becomes stable (step SA5 in FIG. 4) in this manner, the control section 21 restores the voltage current correlation information to that before the change, and controls the reactive current based on the voltage current correlation information before the change (step SA6 in FIG. 4).

In the case where the utility grid does not become stable even after the control of the reactive current in the above manner, operation is stopped (step SA7 in FIG. 4).

As described above, according to the wind turbine generator 1 and the control method thereof in the present embodiment, when the utility grid voltage varied by the predetermined value or more and the voltage of the utility grid 2 is not in the predetermined range (e.g., ±10% with respect to the reference voltage) set in advance after the predetermined time period has passed since the variation occurred, the voltage current correlation information is changed so that the amount of the reactive current with respect to the variation in the voltage becomes greater, and the reactive current to be supplied to the utility grid 2 is controlled based on the changed voltage current correlation information. In this way, in the case where it is impossible to restore the utility grid voltage at a desired speed by carrying out control based on the voltage current correlation information before the change, the voltage-current correlation information is changed in order to abruptly change an amount of the reactive current to be supplied/absorbed. Therefore, it is possible to swiftly shift the voltage of the utility grid 2 to the reference voltage.

Figure 5:
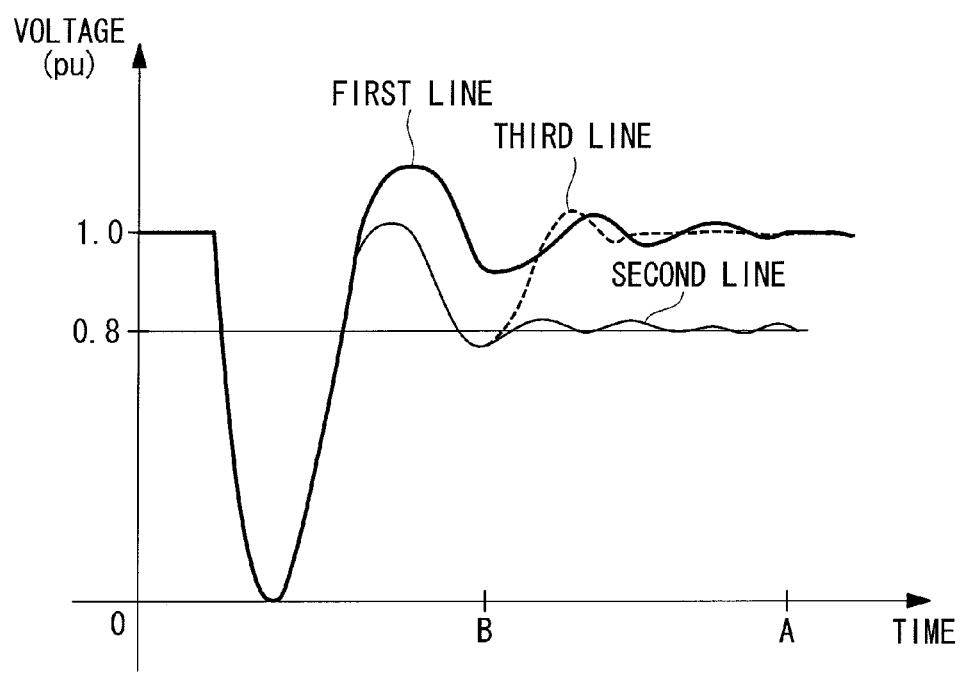
FIG. 5 is an exemplary graph showing variation of the voltage of the utility grid on a time series.

FIG. 5 shows an exemplary graph showing recovery of the voltage of the utility grid 2 on a time series.

As shown in FIG. 5, an ideal graph on how the utility grid voltage approaches the predetermined voltage range set in advance after the drop is a first line and it takes A seconds for the voltage of the utility grid 2 to reach 1.0 Pu equal to the reference value. However, in the case where the reactive current is supplied based on the voltage-current correlation information shown by 1b in FIG. 2, the amount of the reactive current reduces in the course of the utility grid voltage approaching the predetermined range (the range in which the utility grid voltage is considered to be stabilized). As a result, the voltage recovery performance correspondingly reduces and the utility grid voltage cannot reach (converge into) the predetermined range (a second line in FIG. 5).

Figure 3:
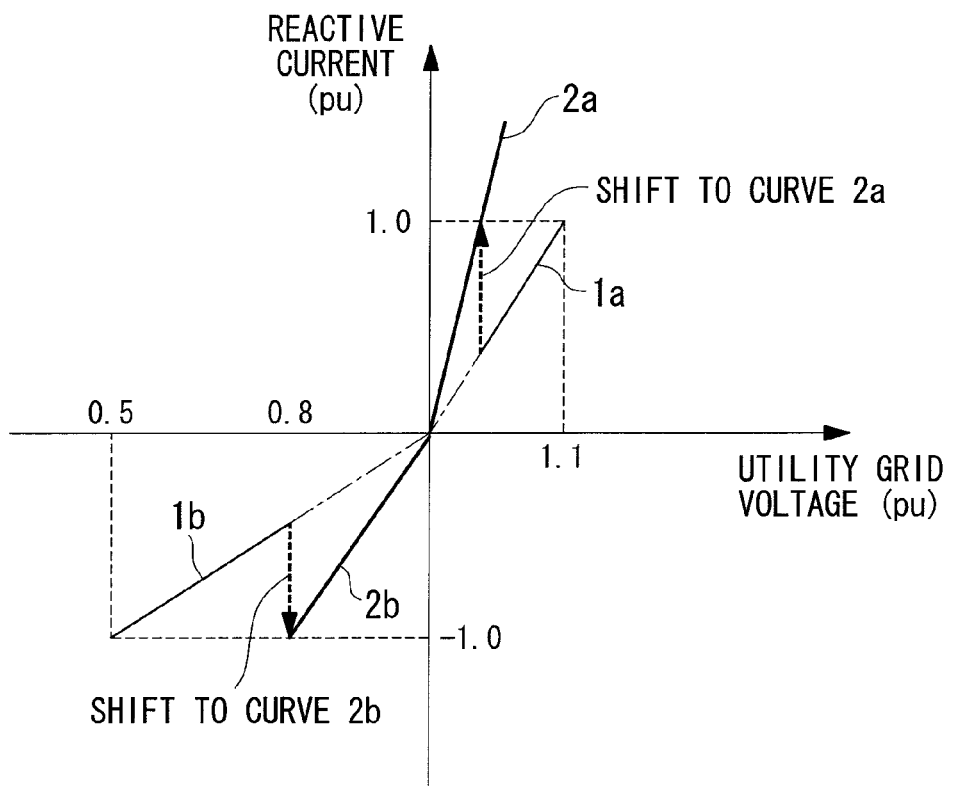
FIG. 3 is a graph showing an example of voltage current correlation information, after the change, on the relationship between voltage of the utility grid and reactive current.

In this case, by changing the voltage current correlation information with the information changing section 22 according to the present embodiment after the predetermined time period (B seconds in FIG. 5) has passed since the voltage decreased, the amount of the reactive current is increased as shown by 2b in FIG. 3, the voltage recovery performance is enhanced, and the voltage of the utility grid 2 is brought close to the reference voltage. As a result, it is possible to swiftly bring the voltage of the utility grid 2 close to the reference voltage as shown by a third line in FIG. 5, and the voltage of the utility grid 2 along the third line can more swiftly approach the predetermined range by the time the voltage of the utility grid 2 becomes 1.0 Pu equal to the reference value relative to that along the first line.

In this way, upon bringing the voltage of the utility grid 2 close to the predetermined range when the voltage of the utility grid 2 decreases due to a power failure or the like, it is possible to prevent saturation of the voltage at a certain voltage value, which disables supply of the reactive current and delays recovery of the voltage of the utility grid 2 to the predetermined range. Instead, it is possible to reliably bring the voltage close to the reference voltage as well as swift recovery can be achieved.

Because time required to change the voltage current correlation information is from several milliseconds to several hundred milliseconds, it is possible to promptly restore the utility grid even taking into consideration the time required to change the voltage current correlation information, as compared with restoring of the utility grid by supplying the reactive current without changing the voltage current correlation information.

Although the information changing section 22 changes the voltage current correlation information only once in the description of the wind turbine generator 1 in the present embodiment, the number of times the voltage current correlation information is changed is not especially limited. For example, in the case where the utility grid voltage does not become stable after the change of the voltage current correlation information, the voltage current correlation information may be changed again, and may be changed repeatedly until the utility grid voltage becomes stable.

Although the voltage current correlation information kept by the information changing section 22 is provided in a form of the graph, the present invention is not limited thereto. Alternatively, the voltage current correlation information may be provided in a form of an arithmetic expression, a table, or the like.

Although the embodiment of the present invention has been described in detail with reference to the drawings, a specific structure is not limited to that according to this embodiment and may include modifications in design without departing from a gist of the present invention.

The invention claimed is:

1. A generating apparatus comprising: a generator connected to a utility grid; a voltage detecting section for detecting voltage of the utility grid; and a control section for determining reactive current corresponding to the voltage obtained from the voltage detecting section based on voltage current correlation information in which the voltage of the utility grid and the reactive current to be supplied to the utility grid are correlated with each other and controlling an electric power converting section to regulate the reactive current to be supplied to or absorbed from the utility grid, the apparatus further comprising an information changing section for changing the voltage current correlation information to increase an amount of reactive current with respect to a variation in the voltage in the voltage current correlation information, in the case where the voltage of the utility grid is not in a predetermined range set in advance after a predetermined time period has passed since the voltage of the utility grid varied by a predetermined amount or more.

2. A generating apparatus according to claim 1, wherein the information changing section is capable of changing the amount of the reactive current with respect to the variation in the voltage in the voltage current correlation information based on a difference between the reference voltage and the voltage value of the utility grid after the predetermined time period has passed since the voltage of the utility grid varied by the predetermined amount or more.

3. A control method of a generator including: a generator connected to a utility grid; a voltage detecting section for detecting voltage of the utility grid; and a control section for determining reactive current corresponding to the voltage obtained from the voltage detecting section based on voltage current correlation information in which the voltage of the utility grid and the reactive current to be supplied to the utility grid are correlated with each other and controlling an electric power converting section to regulate the reactive current to be supplied to or absorbed from the utility grid, the method comprising the step of changing the voltage current correlation information to increase an amount of the reactive current with respect to a variation in the voltage in the voltage current correlation information, in the case where the voltage of the utility grid is not in a predetermined range set in advance after a predetermined time period has passed since the voltage of the utility grid varied by a predetermined amount or more.

* * * * *